United States Patent [19]

Brinkman

[11] 4,014,558
[45] Mar. 29, 1977

[54] CHUCK-CLOSING MECHANISM FOR AUTOMATIC SCREW MACHINE

[75] Inventor: Earl W. Brinkman, Rochester, N.Y.

[73] Assignee: Davenport Machine Tool Co., Inc., Rochester, N.Y.

[22] Filed: Mar. 8, 1976

[21] Appl. No.: 664,518

Related U.S. Application Data

[63] Continuation of Ser. No. 491,308, July 24, 1974, abandoned.

[52] U.S. Cl. .................................. 279/50; 279/57
[51] Int. Cl.² ........................................ B23B 31/20
[58] Field of Search ................ 279/1 B, 50, 51, 57, 279/58, 65, 74, 122

[56] References Cited

UNITED STATES PATENTS

| | | | |
|---|---|---|---|
| 2,735,687 | 2/1956 | Cox | 279/51 |
| 3,176,553 | 4/1965 | Schubert | 279/50 X |
| 3,741,572 | 6/1973 | Nemoto et al. | 279/50 |

*Primary Examiner*—Othell M. Simpson
*Assistant Examiner*—Z. R. Bilinsky
*Attorney, Agent, or Firm*—Shlesinger, Fitzsimmons & Shlesinger

[57] ABSTRACT

When the conventional feed yoke is moved forwardly by the conventional mechanism of an automatic screw machine, an internal conical surface on a ball sleeve, which is moved forwardly by the yoke, operating through balls forces the chuck-closing sleeve forward to close the split collet to grip and hold the bar stock firmly during a machining operation.

9 Claims, 6 Drawing Figures

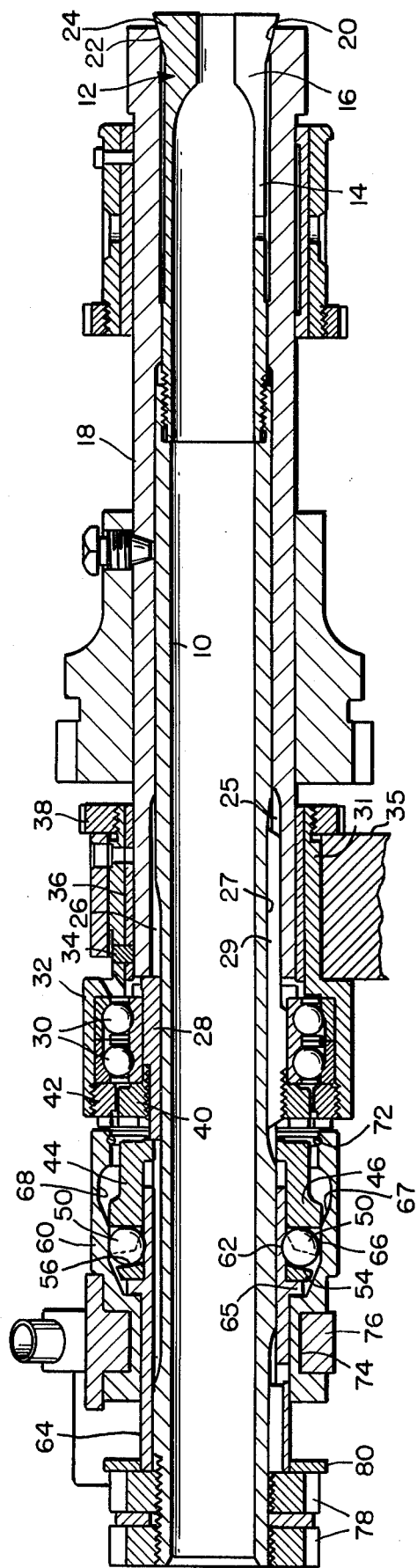
FIG. 1
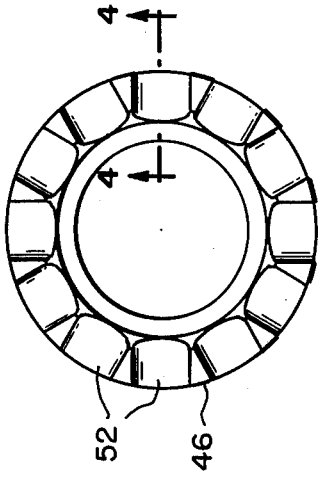
FIG. 3
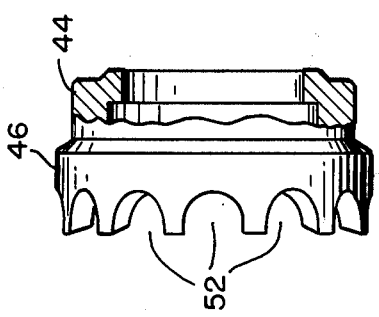
FIG. 2
FIG. 4

CHUCK-CLOSING MECHANISM FOR AUTOMATIC SCREW MACHINE

This is a continuation of application Ser. No. 491,308, filed July 24, 1974 now abandoned.

The present invention relates to screw machines, and more particularly to mechanism for actuating a collet-type chuck to bar stock gripping position for a machining operation thereon.

In screw machines, bars of stock are fed axially intermittently to the cutting tools for successive threading or other operations. When the forward portion of the bar has been threaded to the desired length, or another desired operation has been performed thereon, the workpiece produced is cut off from the forward end of the bar stock; and the bar is fed forward again to bring another part thereof into position for the machining of another workpiece therefrom.

Various means have been employed heretofore for effecting operation of the collet-type chucking mechanism. In some instances this mechanism is moved to chuck-releasing and chuck-engaging positions by fluid pressure operated means. In another instance, a plurality of levers are disposed angularly about the chuck-operating sleeve; and these levers are moved to operating position, upon forward movement of the yoke, to move through extension members, the collet-operating sleeve to chucking position. The levers are fulcrumed on pins, that are mounted in a collar and abut the extension pins when moved to operative position. It is impossible, though, to produce the fulcrums and levers to match perfectly. However, unless all the fulcrums are held most accurately and most precisely, not all the levers will work equally; and one lever may do all the work with the result that there is excessive wear on the fulcrum for that lever. Moreover, the desired chucking tension in ft. lbs., therefore, would not be produced.

A primary object of the present invention is to provide improved means for moving the chuck-operating sleeve to chuck-closing position.

A further object of this invention is to provide an even distribution of force from each extension member to the chuck sleeve.

Another object of the invention is to provide a chuck-operating mechanism of the character described which can be quickly and easily changed to vary the amount of torque applied to the stock.

Other objects of the invention will be apparent hereinafter from the specification and from the recital of the appended claims when read in conjunction with the accompanying drawings.

In the drawings:

FIG. 1 is an axial sectional view showing a work spindle for an automatic screw machine incorporating a chuck-closing mechanism built according to one embodiment of this invention, the work spindle chuck being shown in its closed position;

FIG. 2 is a side elevation on a somewhat enlarged scale of the ball cage of this mechanism, part of the cage being broken away and shown in section;

FIG. 3 is an end elevation of this cage;

FIG. 4 is a fragmentary sectional view taken along the line 4—4 of FIG. 3 further illustrating the structure of this cage;

Figure 5:
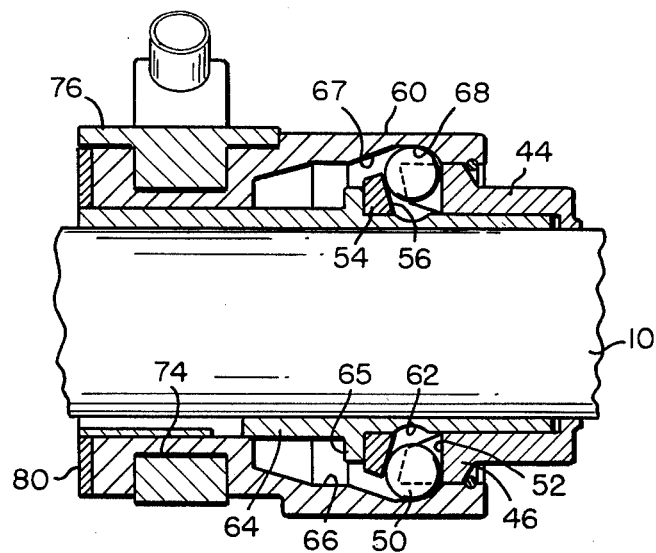
FIG. 5 is an enlarged axial sectional view similar to FIG. 1 but showing the chuck-closing mechanism as it appears when the chuck is in its open position.

Referring now to the drawings by numerals of reference, 10 denotes the inner spindle for housing the feed tube (not illustrated) in which the bar of stock is entered for progressive, intermittent feed to the tools of an automatic screw threading machine. Threaded on the forward end this spindle 10 is a flexible collet type guiding and gripping chuck 12. The collet chuck 12 has therein equi-angularly spaced slots 14 extending rearwardly from its front end to provide gripping fingers 16 for gripping and centering the bar stock during mechanining operations thereon.

The inner spindle 10 is mounted coaxially within an outer spindle or collet-closing sleeve 18, which has an internal conical surface 20 at its forward end to cooperate with the external conical surfaces 22 formed on the collet fingers 16, so that when the sleeve 18 is moved forwardly on spindle 10, as noted hereinafter, the fingers 16 are compressed on the bar of stock to grip the same.

Figure 6:
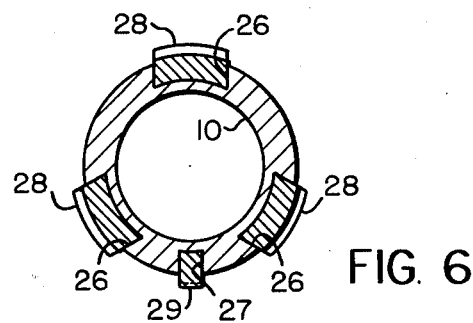
FIG. 6 is a transverse section through the inner spindle illustrating also in section the extension members and key that are mounted therein.

The spindle 10 has intermediate its ends three longitudinal grooves 26 (FIGS. 1 and 6), which are equiangularly spaced about the spindle axis, and a key slot or way 27 located midway between two of the grooves 26. Mounted for reciprocable movement in each groove 26 is an elongate extension member 28 (FIGS. 1 and 6). Sleeve 18 abuts at its rear end against the front ends (right ends in FIG. 1) of these extension members. A driving key 29, which is soldered in way 27 projects into a registering way 25 (FIG. 1) in the outer spindle 18, so that spindle 18 rotates with, but is axially slidable on, the inner spindle 10.

The extension members 28 are surrounded by the inner race of two ball bearings 30 (FIG. 1) whose outer races are held in a bearing housing 32, which has a hub-section 31 that is secured in a revolving head 35 over the rear end of spindle 18 by a nut 38. A bronze bushing 36 is secured in the hub section 31 around spindle 18 by a brass pin 34. The inner and outer races of the ball bearings 30 are held in place by two nuts 40 and 42, which thread onto the inner spindle 10 and into the housing 32, respectively.

The extensions 28 abut at their rear or left ends (FIG. 1) against the annular hub 44, which projects from one end of a ball cage 46. In its opposite end cage 46 has a plurality of spaced pockets 52 for carrying a plurality of balls 50. As shown in FIGS. 2 to 4 the pockets 52 are substantially semi-cylindrical in cross section, and are equi-angularly spaced about the axis of cage 46 with their respective axes extending radially of the cage centerline or axis. Moreover, as shown in FIGS. 1 and 5, the balls 50 are held in the pockets 52 by the wall washer 54, which has a conical camming surface 56 which is engaged by the balls.

The balls 50 are held between the washer 54 and cage 46 by a ball sleeve 60 (FIGS. 1 and 5), which surrounds cage 46, and by an inner sleeve 64, which is axially slidable on the rear end of inner spindle 10. Sleeve 60 has an internal, cylindrical surface 66, which overlies the balls 50 to hold them in an operative position adjacent the annular clearance recess 62 (FIGS. 1 and 5) in the outer periphery of sleeve 64, when the chuck 12 is in its closed position (FIG. 1). The cylindrical surface 66 in sleeve 60 is connected by an internal conical surface 67 to a circumferential recess 68, which is larger in diameter than that of surface 66, and which register with the balls 50 when the chuck 12 is in its open position (FIG. 5).

A conventional split retaining ring 72 (FIG. 1) engages in an internal groove in the sleeve 60 merely to keep the cage 46 in the outer ball sleeve 60 during assembly of the mechanism.

In its rear or left end (FIG. 1), the ball sleeve 60 has an external peripheral groove 74 in which a yoke member 76 (FIG. 1) engages to shift the ball sleeve axially through the conventional shifting mechanism (not illustrated) of a screw machine. Intermediate its ends the inner sleeve 64 has thereon an external, circumferential flange 65 which engages the back of washer 54 to prevent the washer from moving rearwardly on the sleeve. Sleeve 64 extends rearwardly beyond the ball sleeve 60, and engages the adjusting nuts 78, which are threaded onto the inner spindle 10. A washer 80 on sleeve 64 prevents sleeve 60 from striking nuts 78 when the former is moved to its chuck opening position (FIG. 5).

The sleeve 10 is open at its rear end for insertion therein of the bar of stock.

To close the chucking mechanism in the cycle of operation of the machine, the yoke 76 is shifted forwardly or to the right from its position as shown in FIG. 5 to its position as shown in FIG. 1. This shifts the ball sleeve 60 relative to the balls 50, so that first the inclined surface 67, and then the cylindrical surface 66 in sleeve 60 pass over the balls 50, thereby forcing the balls radially inwardly toward the clearance recess 62 in sleeve 64. During this movement washer 54 is held stationary by flange 65, so that as the balls 50 are forced radially inwardly, each ball 50 is in arcuate contact with the semi-cylindrical wall of its associated pocket 52 in cage 46, and is caused to slide inwardly along the inclined face 56 of the washer 54. The balls are thus shifted by washer 54 slightly axially forwardly, or to the right, and in turn transmit this slight axial movement to the cage 46. The hub 44 on cage 46, in turn, urges the extensions 28 forwardly, which thereby advance the outer spindle 18 forwardly a like distance. The forward movement of the spindle 18 moves the fingers 16 of the collet chuck 12 to gripping positions to clamp the work in spindle 10.

When the yoke retracts the ball sleeve 60, the balls 50 ride outwardly into the recess 68 in sleeve 60 (FIG. 5), thereby allowing the chuck 12 to return to its open position.

By adjusting the nuts 78, the sleeve 64 can be shifted axially on the rear end of spindle 10 to adjust the axial position of washer 54 on spindle 10, and thereby to adjust the fully closed positions of the collet fingers 16. For example, when the washer 54 is shifted to the right (FIG. 1) on spindle 10 by adjustment of nuts 78 (and hence sleeve 64), a corresponding shift is imparted to cage 46, extension members 28 and spindle 18, so that the jaws 16 will now be forced slightly radially inwardly therefore reducing the diameter of their fully open and closed positions, respectively. Loosening of nuts 78 will, of course, produce the opposite effect.

While the invention has been described in connection with a specific embodiment thereof, it will be understood that it is capable of further modification; and this application is intended to cover any modifications of the invention which come within the invention or the recital of the appended claims.

Having thus described my invention, what I claim is:

1. A chucking mechanism comprising
   an inner spindle,
   a split tubular collet secured to the forward end of said spindle and having thereon a plurality of flexible, angularly spaced fingers, each of which has an external conical surface,
   a chuck-closing spindle surrounding said inner spindle and collect and having an internal conical surface complementary to and engaging the external surfaces of said fingers, and
   means for moving said chuck-closing spindle axially on said inner spindle in a direction to move said collet fingers to clamping position, comprising
   an annular ball cage axially slidable on said inner spindle rearwardly of said chuck-closing spindle and operatively connected to said chuck-closing spindle coaxially thereof,
   said cage having in one end a plurality of arcuate pockets of substantially semi-cylindrical configuration angularly spaced about the axis of said inner spindle, and extending radially through the annular wall of said cage about axes which intersect the axial centerline of said cage at right angles,
   a plurality of balls movably mounted in said pockets for limited movement radially of said cage, and
   actuating means removably mounted on said one end of said inner spindle in engagement with said balls and operable to transmit motion through said balls and said cage to said chuck-closing spindle, and in the direction to move said collet fingers to clamping position,
   the radii of said pockets and said balls being approximately equal, whereby each ball contacts the surface of its associated pocket along an arcuate line, and
   said ball cage being removable from said one end of said inner spindle independently of said chuck-closing spindle, when said actuating means is removed from said inner spindle.

2. A chucking mechanism as claimed in claim 1, wherein said actuating means comprises
   a ball sleeve reciprocable coaxially of said cage between first and second limit positions, and having an internal conical surface positioned to engage and drive said balls radially of the axis of said inner spindle upon movement of said ball sleeve between its limit positions, and
   an abutment having thereon an inclined surface engageable by said balls to shift said balls and said cage in said direction upon said radial movement of said balls by said sleeve.

3. A chucking mechanism as claimed in claim 2, including a plurality of axially shiftable extension members equiangularly spaced about said inner spindle axis between said chuck-closing spindle and said ball cage to transmit the axial movement of said cage to said chuck-closing spindle.

4. A chucking mechanism as claimed in claim 2, including means for adjusting said abutment axially on said inner spindle thereby to adjust the fully opened and closed positions, respectively, of said collet fingers.

5. A chucking mechanism, particularly for an automatic screw machine, comprising
   an inner, tubular spindle having a collet chuck on the forward end thereof, said chuck having a plurality of flexible, angularly-spaced fingers through which bar stock may be fed, and each of which fingers has an external conical surface, an outer, chuck-closing spindle axially slidable on the forward end of said inner spindle and said collet and having an internal conical surface matching the external conical surfaces of said fingers, a plurality of axially slidable extension members surrounding said inner spindle intermediate its ends and abutting against the rear end of said outer spindle, an annular ball cage coaxially surrounding said inner spindle in engagement with the rear ends of said extension members, and having in one end a plurality of angularly spaced arcuate recesses, each of which has an axis extending radially of said cage at right angles to its axis, an axially reciprocable actuator sleeve surrounding said cage and having in its inner periphery an internal, circumferential recess registrable selectively with the recesses in said cage upon movement of said sleeve to one of its limit positions, means for shifting said sleeve, between its limit positions, a plurality of balls mounted in said recesses in said cage beneath said actuator sleeve for radial movement outwardly into said internal recess in said sleeve, when the latter is in said one of its limit positions, and for movement radially inwardly into the recesses in said cage, when said sleeve is in its other limit position, and an abutment releasably secured to said inner spindle at one side of the recesses in said cage and having thereon an inclined camming surface operative to engage and force said balls and said cage axially toward said extension members, when said balls are moved radially into said recesses in said cage by said sleeve, thereby to shift said members and said outer spindle axially in a direction to close said chuck, said balls and said arcuate recess having approximately identical radii, whereby said balls engage the surfaces of said recesses along arcuate lines, and said actuator sleeve and said abutment being removable from said inner spindle to allow removal of said cage from said inner spindle independently of said chuck-closing spindle.

6. A chucking mechanism as defined in claim 5, wherein said sleeve has in its inner periphery an internal conical surface positioned adjacent said internal circumferential surface and operative to engage said balls upon movement of said sleeve axially between its limit positions selectively to cause said balls to shift radially inwardly into the recesses in said cage, or to allow said balls to shift outwardly in said circumferential recess in said sleeve.

7. A chucking mechanism as claimed in claim 5, wherein said inner spindle has a plurality of equiangularly-spaced longitudinal slots in its outer periphery, and said extension members are mounted for axial, reciprocable movement in said slots.

8. A chucking mechanism as claimed in claim 5, wherein said cage comprises an annular member surrounding said inner spindle and engaged at one end with said extension members, and having in its opposite end said spaced radial recesses, and said abutment comprises a ring secured on said inner spindle rearwardly of said cage and having a conical face forming said inclined camming surface and facing the recesses in said cage, and engaging said balls to control the axial movement thereof.

9. A chucking mechanism as claimed in claim 8, including means for adjusting the axial position of said ring on said inner spindle.

* * * * *